John Bean,
Water Filter
109288
PATENTED NOV 15 1870
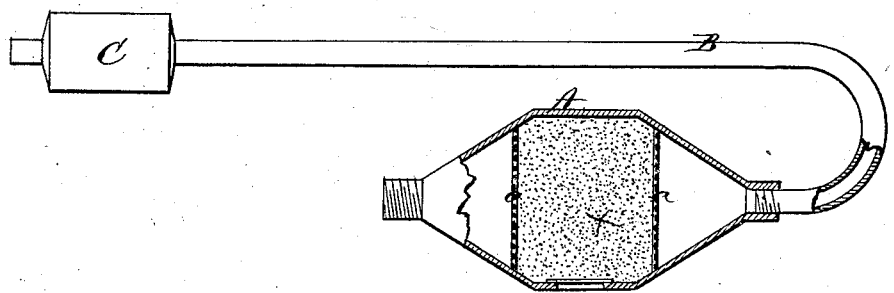
Witnesses
C. L. Evert
Jd. Hutchinson
Inventor
John Bean
per
Alexander Mason
Atty.

United States Patent Office.

JOHN BEAN, OF HUDSON, MICHIGAN.

Letters Patent No. 109,288, dated November 15, 1870.

IMPROVEMENT IN FILTERS

The Schedule referred to in these Letters Patent and making part of the same.

*To all whom it may concern:*

Be it known that I, JOHN BEAN, of Hudson, in the county of Lenawee and in the State of Michigan, have invented certain new and useful Improvements in Water-Filter; and do hereby declare that the following is a full, clear, and exact description thereof, reference being had to the accompanying drawing and to the letters of reference marked thereon making a part of this specification.

The nature of my invention consists in the construction and arrangement of a reversible filter, with air-chamber to be applied to force-pumps, as will be hereinafter fully set forth.

In order to enable others skilled in the art to which my invention appertains to make and use the same, I will now proceed to describe its construction and operation, referring to the annexed drawing, which represents a side view, part in section, of my filter.

A represents the filter, which is made conical at both ends, as shown, so that either end may be screwed on to the stalk B.

The center of this filter is packed very close with fine quartz, sand, or pounded glass, so fine that it requires a pressure of thirty feet of water to work well.

On either side of this center filling is a screen, *a*, and the ends of the filter is filled with coarser sand or quartz.

At a suitable point in the stalk B, between the pump and the filter, is formed an air-chamber C.

As the water or other fluid desired to be filtered passes the center of the filter, it leaves behind, in the upper end of the filter, any filth or impurities that may be in the same.

By reversing the filter A, and first forcing through the air which is in the stalk and air-chamber, the dirt is loosened. Then the water, following with a heavy pressure, forces out this dirt, and then the filter goes on as before.

The air, it will readily be seen, will pass through first, opening the way, stirring up the dirt, and so preparing it that the water will take it out quick and clean.

Having thus fully described my invention,

What I claim as new, and desire to secure by Letters Patent, is—

The arrangement of the stalk B with air-chamber C and the reversible filter A, all substantially as set forth.

In testimony that I claim the foregoing, I have hereunto set my hand this 1st day of July, 1870.

JOHN BEAN.

Witnesses:
G. I. THOMPSON,
CHAS. DUNLAUS.